United States Patent
Shivaji-Rao et al.

(10) Patent No.: US 8,341,238 B2
(45) Date of Patent: Dec. 25, 2012

(54) METHODS AND SYSTEMS FOR MULTIPLE-DEVICE SESSION SYNCHRONIZATION

(75) Inventors: Vishnu Kumar Shivaji-Rao, Vancouver, WA (US); Mark G. Hanley, Skamania, WA (US); David C. Barton, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 862 days.

(21) Appl. No.: 11/838,188

(22) Filed: Aug. 13, 2007

(65) Prior Publication Data

US 2007/0274422 A1    Nov. 29, 2007

Related U.S. Application Data

(63) Continuation-in-part of application No. 11/367,939, filed on Mar. 3, 2006, and a continuation-in-part of application No. 11/367,937, filed on Mar. 3, 2006.

(51) Int. Cl.
*G06F 15/16* (2006.01)

(52) U.S. Cl. ............ 709/217; 709/203; 725/10; 725/11; 725/38; 725/47; 725/60; 725/61

(58) Field of Classification Search .............. 725/10–11, 725/38, 47, 60–61; 709/203, 217
See application file for complete search history.

(56) References Cited

U.S. PATENT DOCUMENTS

| | | | |
|---|---|---|---|
| 4,942,472 A | 7/1990 | Imbert | |
| 5,274,448 A | 12/1993 | Leuz et al. | |
| 5,903,266 A | 5/1999 | Berstis et al. | |
| 5,956,024 A * | 9/1999 | Strickland et al. | 715/717 |
| 5,995,092 A * | 11/1999 | Yuen et al. | 725/40 |
| 6,202,210 B1 | 3/2001 | Ludtke | |
| 6,292,172 B1 | 9/2001 | Makhlouf | |
| 6,371,854 B1 | 4/2002 | Ikeda et al. | |
| 6,448,963 B1 | 9/2002 | Han | |
| 6,469,742 B1 | 10/2002 | Trovato et al. | |
| 6,530,085 B1 | 3/2003 | Perlman | |
| 6,756,997 B1 | 6/2004 | Ward | |
| 6,772,096 B2 | 8/2004 | Murakami et al. | |
| 6,781,635 B1 | 8/2004 | Takeda | |
| 6,819,364 B2 | 11/2004 | Creed | |
| 6,829,779 B1 | 12/2004 | Perlman | |
| 7,039,698 B2 | 5/2006 | Slemmer et al. | |
| 7,043,691 B1 | 5/2006 | Kwon et al. | |
| 7,107,529 B2 | 9/2006 | Lee | |
| 7,114,167 B2 | 9/2006 | Slemmer et al. | |

(Continued)

FOREIGN PATENT DOCUMENTS

EP    1517259    3/2005

(Continued)

OTHER PUBLICATIONS

USPTO Office Action—U.S. Appl. No. 11/781,099—Mailing Date Oct. 28, 2011.

(Continued)

*Primary Examiner* — Duyen Doan

(74) *Attorney, Agent, or Firm* — Kristine Elizabeth Matthews; David C. Ripma

(57) ABSTRACT

Aspects of the present invention relate to systems and methods for session synchronization between multiple devices connected to a server system.

20 Claims, 13 Drawing Sheets

U.S. PATENT DOCUMENTS

| | | |
|---|---|---|
| 7,142,230 B2 | 11/2006 | Novak et al. |
| 7,283,178 B2 | 10/2007 | Dahlseid et al. |
| 7,295,194 B2 | 11/2007 | Lee |
| 7,333,131 B2 | 2/2008 | Manabe |
| 7,526,582 B2 | 4/2009 | Best et al. |
| 7,644,426 B2 | 1/2010 | Suh |
| 7,755,503 B2 | 7/2010 | Bonorden et al. |
| 7,797,711 B2 | 9/2010 | Iwamura |
| 7,880,816 B2 | 2/2011 | Kinoshita et al. |
| 7,889,233 B2 | 2/2011 | Mead et al. |
| 7,921,235 B2 | 4/2011 | Best et al. |
| 8,009,234 B2 | 8/2011 | Lee et al. |
| 2001/0052946 A1 | 12/2001 | Sato |
| 2002/0060676 A1 | 5/2002 | Kim |
| 2002/0065912 A1* | 5/2002 | Catchpole et al. ............ 709/224 |
| 2002/0073208 A1* | 6/2002 | Wilcock et al. ............... 709/227 |
| 2002/0149705 A1 | 10/2002 | Allen |
| 2002/0161839 A1* | 10/2002 | Colasurdo et al. ............ 709/204 |
| 2003/0055974 A1 | 3/2003 | Brophy |
| 2003/0105805 A1 | 6/2003 | Jorgenson |
| 2003/0110412 A1 | 6/2003 | Neville |
| 2003/0220901 A1 | 11/2003 | Carr |
| 2004/0068573 A1 | 4/2004 | Corbeil |
| 2004/0073432 A1 | 4/2004 | Stone |
| 2004/0119731 A1 | 6/2004 | Lee |
| 2004/0143669 A1* | 7/2004 | Zhao et al. .................... 709/228 |
| 2004/0181801 A1* | 9/2004 | Hagen et al. .................... 725/32 |
| 2004/0189805 A1 | 9/2004 | Seitz |
| 2005/0018084 A1 | 1/2005 | Cho |
| 2005/0140787 A1 | 6/2005 | Kaplinsky |
| 2005/0141542 A1 | 6/2005 | Handekyn |
| 2005/0149980 A1 | 7/2005 | Yun |
| 2005/0162562 A1 | 7/2005 | Nave |
| 2005/0174488 A1 | 8/2005 | Chennakeshu |
| 2005/0210135 A1 | 9/2005 | Abrahams |
| 2005/0259181 A1 | 11/2005 | Watanabe |
| 2005/0261985 A1 | 11/2005 | Miller |
| 2006/0001776 A1 | 1/2006 | Araki |
| 2006/0078072 A1 | 4/2006 | Cheon |
| 2006/0158838 A1 | 7/2006 | Kinoshita et al. |
| 2006/0164561 A1 | 7/2006 | Lacy et al. |
| 2006/0184681 A1 | 8/2006 | Bernardi |
| 2006/0221254 A1 | 10/2006 | Chang |
| 2006/0230312 A1 | 10/2006 | Nichols et al. |
| 2007/0038599 A1* | 2/2007 | Pearson ............................ 707/3 |
| 2007/0126930 A1 | 6/2007 | Jang |
| 2007/0143576 A1 | 6/2007 | Ellgen et al. |
| 2007/0153131 A1 | 7/2007 | Yang |
| 2007/0153132 A1 | 7/2007 | Jong |
| 2007/0162929 A1* | 7/2007 | Mickle et al. .................... 725/37 |
| 2007/0298656 A1 | 12/2007 | He |
| 2008/0046916 A1* | 2/2008 | Shivaji-Rao .................... 725/25 |
| 2008/0055464 A1 | 3/2008 | Shin |
| 2008/0062328 A1 | 3/2008 | Bilbrey |
| 2009/0183242 A1* | 7/2009 | Rao et al. .......................... 726/5 |
| 2009/0304069 A1 | 12/2009 | Hoffert et al. |

FOREIGN PATENT DOCUMENTS

| | | |
|---|---|---|
| WO | WO0133858 | 5/2001 |
| WO | WO 03044684 | 5/2003 |
| WO | WO2005059767 A1 | 6/2005 |

OTHER PUBLICATIONS

U.S. Office Action—U.S. Appl. No. 11/781,099—Mailing Date Apr. 11, 2011.

* cited by examiner

METHODS AND SYSTEMS FOR MULTIPLE-DEVICE SESSION SYNCHRONIZATION

RELATED REFERENCES

This application is a continuation-in-part of U.S. patent application Ser. No. 11/367,939, entitled "Methods and Systems for Configuring Media-Playing Sets," filed on Mar. 3, 2006; this application is also a continuation-in-part of U.S. patent application Ser. No. 11/367,937, entitled "Methods and Systems for Configuring Media-Playing Sets," filed on Mar. 3, 2006. All applications listed in this section are hereby incorporated herein by reference.

FIELD OF THE INVENTION

Embodiments of the present invention comprise methods and systems for session synchronization between multiple devices connected to a server system.

BACKGROUND

As increasing numbers of electronic devices may be capable of inter-connection, there becomes a need for multiple-device session synchronization.

SUMMARY

Some embodiments of the present invention comprise methods and systems for multiple-device session synchronization comprising a stateless system using a real-time-request database construct and real-time-request management logic.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a drawing showing embodiments of the present invention comprising a server system and an electronic device;

FIG. 2. is a chart showing an exemplary SSL handshake protocol;

DETAILED DESCRIPTION OF EXEMPLARY EMBODIMENTS

Figure 1:
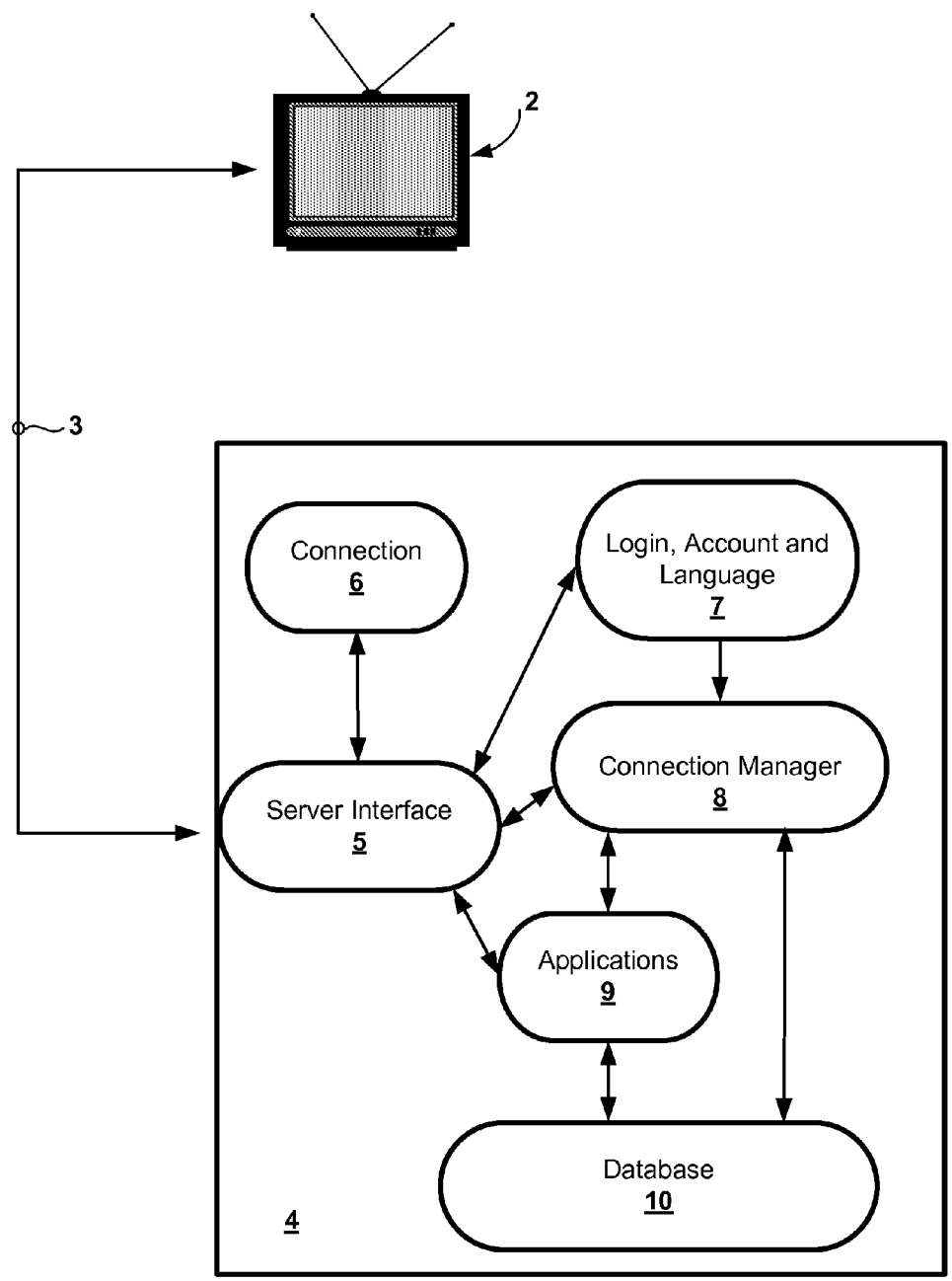

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise methods and systems for inter-connection of electronic devices. Exemplary electronic devices may comprise media-playing devices (e.g., a television or a handheld DVD (Digital Versatile Disc) player), computing devices (e.g., a personal computer), communication devices (e.g., a cellular telephone), imaging devices (e.g., a digital camera or a video camera) and other electronic devices (e.g., a PDA (Personal Digital Assistant) or a game device). An electronic device may belong to several of the exemplary categories enumerated above. For example, some communication devices, such as some cellular telephones, may also be considered media-play devices and imaging devices.

In some embodiments of the present invention, an electronic device, also considered a client device, may be connected through a remote server at a customer support center to a customer-support computing device. In some embodiments the customer-support computing device may be associated with a customer service representative. In alternative embodiments of the present invention, a first electronic device may be connected through a remote server to a second electronic device. In some embodiments, both the first electronic device and the second electronic device may be under the control of a single user. In alternative embodiments, the first electronic device may under the control of a first user, and the second electronic device may be under the control of a second user.

In some embodiments of the present invention, a client device may comprise a display, a user input device (e.g., a keyboard, a mouse or a remote control), network connectivity and software. Exemplary client-device software may comprise a network TCP/IP (Transmission Control Protocol/Internet Protocol) stack, a network SSL (Secure Sockets Layer) software stack, network-connectivity client software (e.g., an HTTP (HyperText Transfer Protocol) client) and other software.

In some embodiments of the present invention, a server system may comprise a processor, a storage device, network connectivity and software. In alternative embodiments, a server system may further comprise a display. Exemplary server software may comprise server management tools, a network TCP/IP stack, a network SSL software stack, network-connectivity server software (e.g., Apache HTTP server), an FTP (File Transfer Protocol) server, a mail server and other software.

Some embodiments of the present invention may be described in relation to FIG. 1. An electronic device 2 may be communicatively coupled 3 to a server system 4. The server system 4 may comprise a server interface 5 through which a connection component 6 may manage the initial process of connecting the electronic device 2 and the server system 4 software. The server system 4 may further comprise a login, account and language (LAL) component 7, a customer-connection-page manager 8, a plurality of applications 9 and a database 10. In some embodiments of the present invention, the above-enumerated components may reside on a single server device. In alternative embodiments, portions of the server system 4 may reside on multiple server devices (e.g., a communication server, an application server and other servers).

The connection component 6 may manage authentication and encryption portions of the communication between the electronic device, also considered the client, 2 and the server system 4. In some embodiments of the present invention, the connection component 6 may be based on an SSL protocol.

Figure 2:
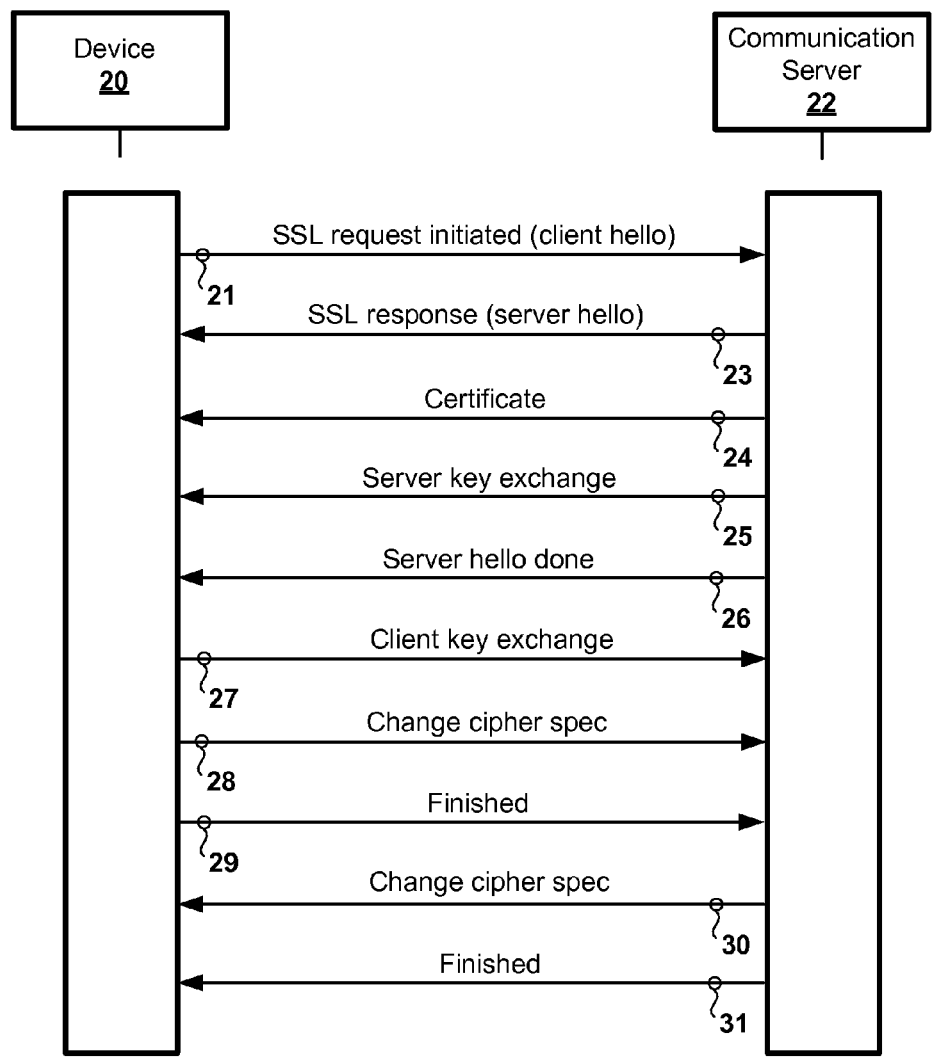

An exemplary SSL handshake protocol may be described in relation to FIG. 2. An electronic device 20 may send an SSL request ("ClientHello") 21 to a server 22 to initiate the negotiation of SSL session characteristics. The server authentication and key exchange may then occur. The server 22 may respond 23 to the device-initiated "ClientHello" message with a "ServerHello." Next the server 22 may send its certificate, and associated certificate chain, 24 to the electronic device 20. The server 22 may then send a public key 25 followed by an end message 26. The client key exchange 27 may then occur from the electronic device 20 to the server 22. The electronic device 20 may tell 28 the server 22 to change cipher and the server 22 may respond 30 with its own changed cipher message. Finished messages 29, 31 may be hashes for verification.

Figure 3:
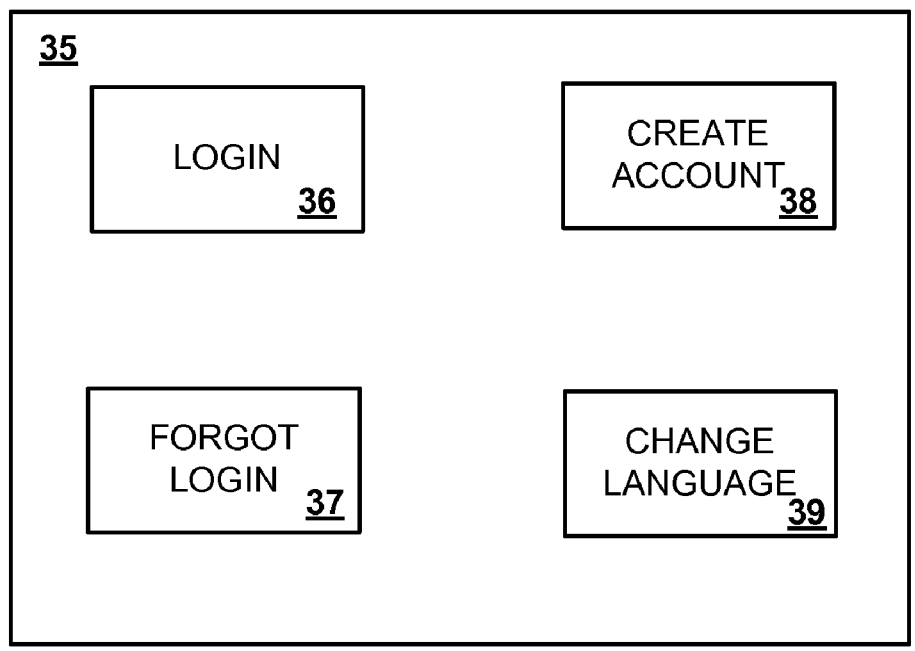
FIG. 3 is a drawing showing an exemplary options display.

In some embodiments of the present invention, the LAL component 7 may be responsible for presenting and handling the login process for valid clients, creating valid client accounts on the server 4, retrieving valid client account information, deleting client account information from the server 4 and creating, on the server 4, a language preference for connected clients. Login, account and language options may be presented via a graphical user interface (GUI) on the electronic device 2. FIG. 3 depicts an exemplary options display 35 on an exemplary electronic device with four options 36, 37, 38, 39. Upon receiving a selection through the GUI, the electronic device 2 may transmit the selection to the server 4.

Figure 4:
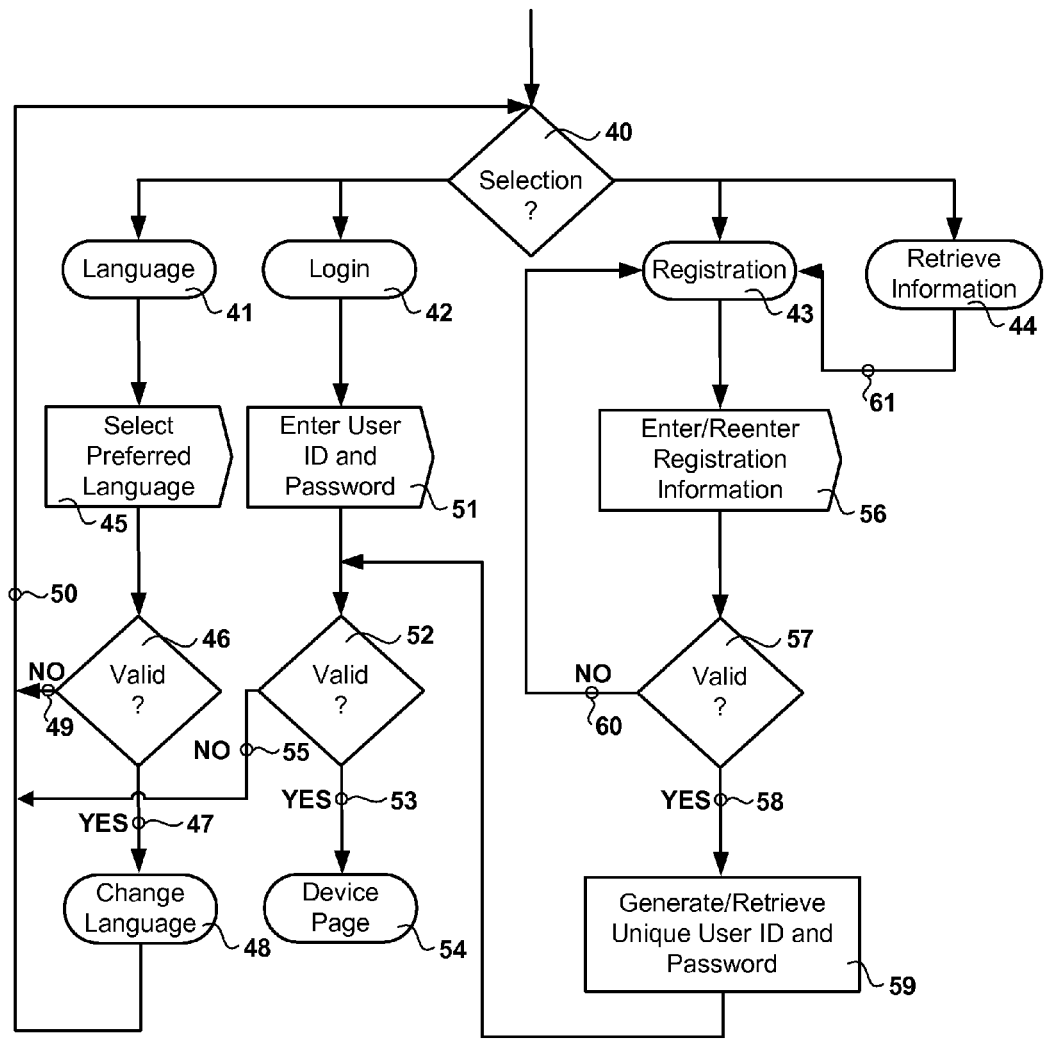
FIG. 4 is a chart showing embodiments of the present invention comprising an exemplary embodiment of a login, account and language (LAL) component.

An exemplary embodiment of the LAL component 7 may be described in relation to FIG. 4. The LAL component 7 may receive a selection 40 sent from the electronic device 2 to the server 4. In some embodiments of the present invention, the selection may be related to one of the following options: "language" option 41, "login" option 42, "registration" option 43, and "retrieve information" option 44. The options may correspond to the options displayed at the electronic device GUI.

If the "language" option 41 is received, then the LAL component 7 may request 45 a preferred language selection from the electronic device. Upon receipt of the preferred language selection, the LAL component 7 may determine 46 if the preferred language selection is a valid selection. If the preferred language selection is a valid selection 47, then the LAL component 7 may change 48 the language setting and then may request 50 a new selection. If the preferred language selection is not a valid selection 49, then the LAL component 7 may request 50 a new selection.

If the "login" option 42 is received, then the LAL component 7 may request 51 login information from the electronic device. Exemplary login information may comprise a user identification (ID), a password and other login information. Upon receipt of the login information, the LAL component 7 may determine 52 if the login information is valid. If the login information is valid 53, then the LAL component 7 may transfer control 54 to the connection manager 8. If the login information is not valid 55, then the LAL component 7 may request 50 a new selection.

If the "registration" option 43 is received, then the LAL component 7 may request 56 registration information. Exemplary registration information may comprise electronic device model, serial number, device owner telephone number, device location zip code and other product or product owner information. Upon receipt of the registration information, the LAL component 7 may determine 57 if the registration information is valid. If the registration information is valid 58, then the LAL component 7 may generate unique login information 59 and determine 52 if the login information is valid. If the registration information is not valid 60, the LAL component 7 may return to the "registration" option 43 selection in order to request registration information again.

If the "retrieve information" option 44 is selected, then the LAL component 7 may redirect 61 to the "registration" option 43. This may allow login information to be retrieved 59 after re-entry of valid registration information.

In some embodiments of the present invention, the connection manager component 8 may be responsible to access and interpret a customer profile. The connection manager component 8 may populate a customer connection page with required support information and features. The connection manager component 8 may also maintain the customer account information page and initiate any valid support or feature selected by a user at the electronic device 2.

Figure 5:
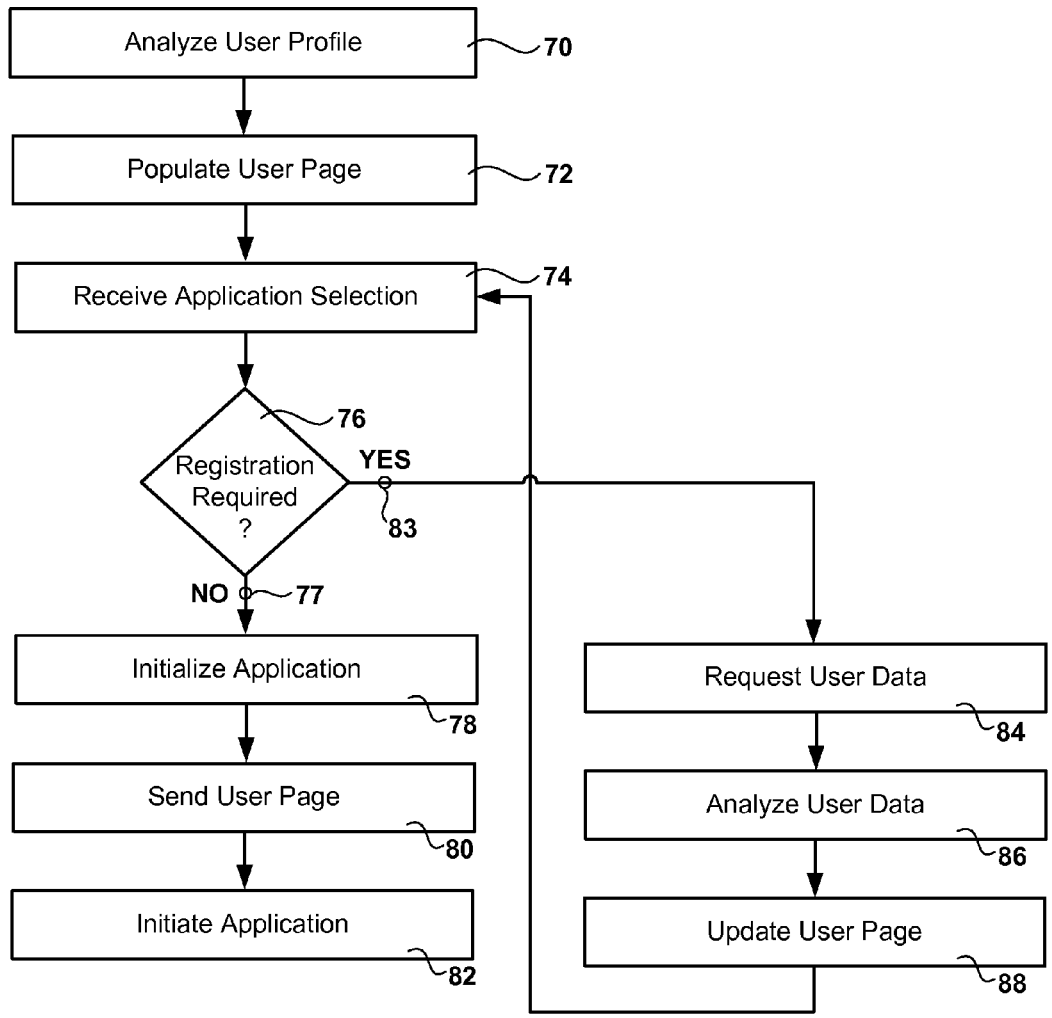
FIG. 5 is chart showing embodiments of the present invention comprising an exemplary embodiment of a connection manager component.

An exemplary embodiment of a connection manager component 8 may be described in relation to FIG. 5. After analyzing 70 a user profile, the connection manager component 8 may populate 72 a user page. The user page may be populated with user data obtained from a database 10. Then upon receipt of an application 9 selection 74 from the electronic device 2, the connection manager component 8 may determine 76 if application-specific registration is required. If application-specific registration is not required 77, then the selected application may be initialized, the user page presented 80 and the selected application initiated 82. If application-specific registration is required 83, then the connection manager component 8 may request 84 user data from the user or the database 10, analyze 86 the user data and update 88 the user page.

Exemplary applications may comprise device remote-control help, device menu control help, device product manual, device customer agent driver frequently asked question (FAQ) help, device-to-device message transfer, user-to-user message transfer and other applications. In some embodiments of the present invention, applications follow a model-view-controller structure.

Figure 6:
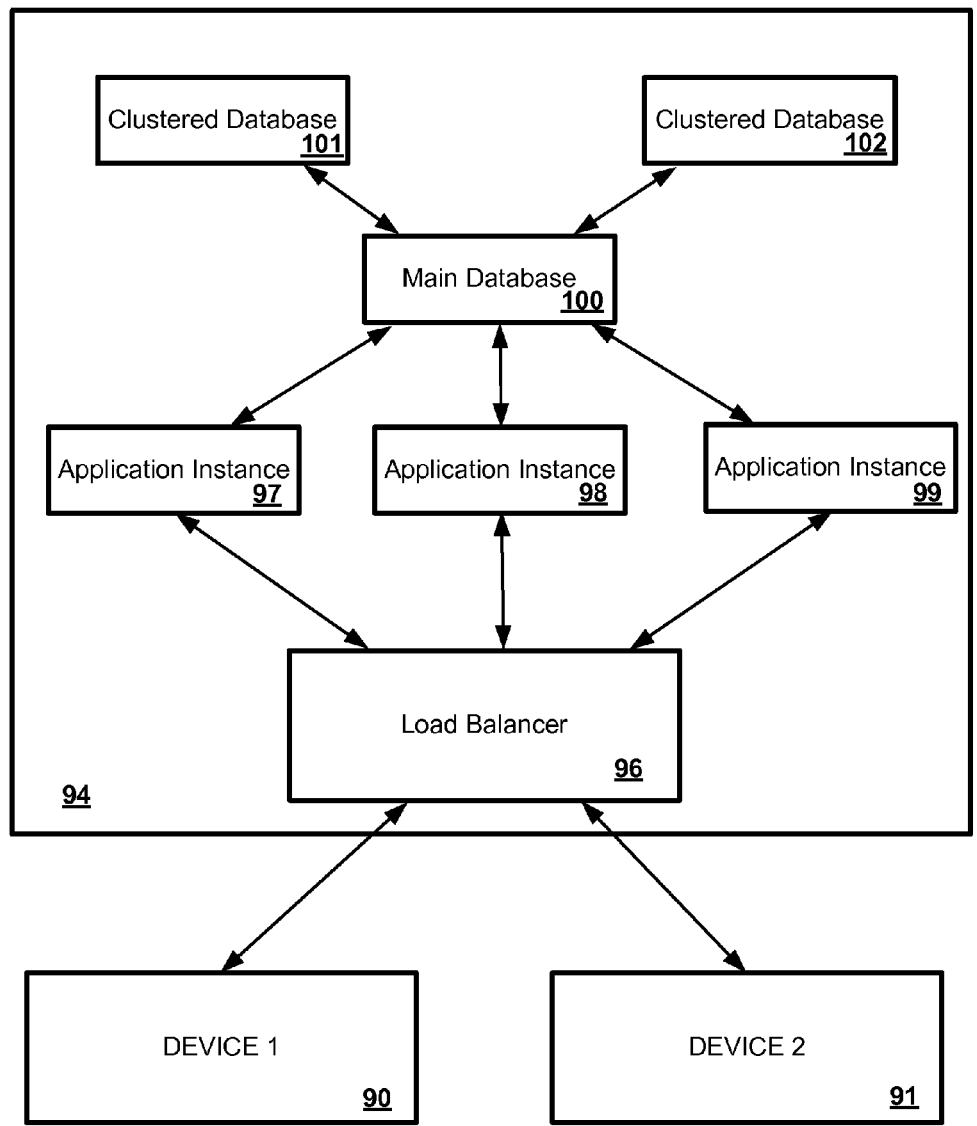
FIG. 6 is a drawing showing embodiments of the present invention comprising a server system and electronic devices.

In some embodiments of the present invention described in relation to FIG. 6, a first electronic device 90 may connect to a second electronic device 92 through a server system 94 which may comprise a load balancer 96, multiple application instances (three shown) 97, 98, 99 which may reside on multiple central processing units (CPUs), a main database 100 and multiple clustered databases (two shown) 101, 102. In some embodiments, communication between an electronic device 90, 91 and the server system 94 may comprise HTTP-XML (extensible Markup Language). The main database 100 and/or a database in the clustered databases 101, 102 may record every transaction between the first electronic device 90 and the second electronic device 92. The transactions may be linked together by the request parameters. In some embodiments of the present invention, the second electronic device 92 may be associated with a customer service representative. In alternative embodiments of the present invention, the second electronic device 92 may be associated with the owner of the first electronic device 90. In yet alternative embodiments of the present invention, the second electronic device 92 may be associated with a second owner.

Figure 7:
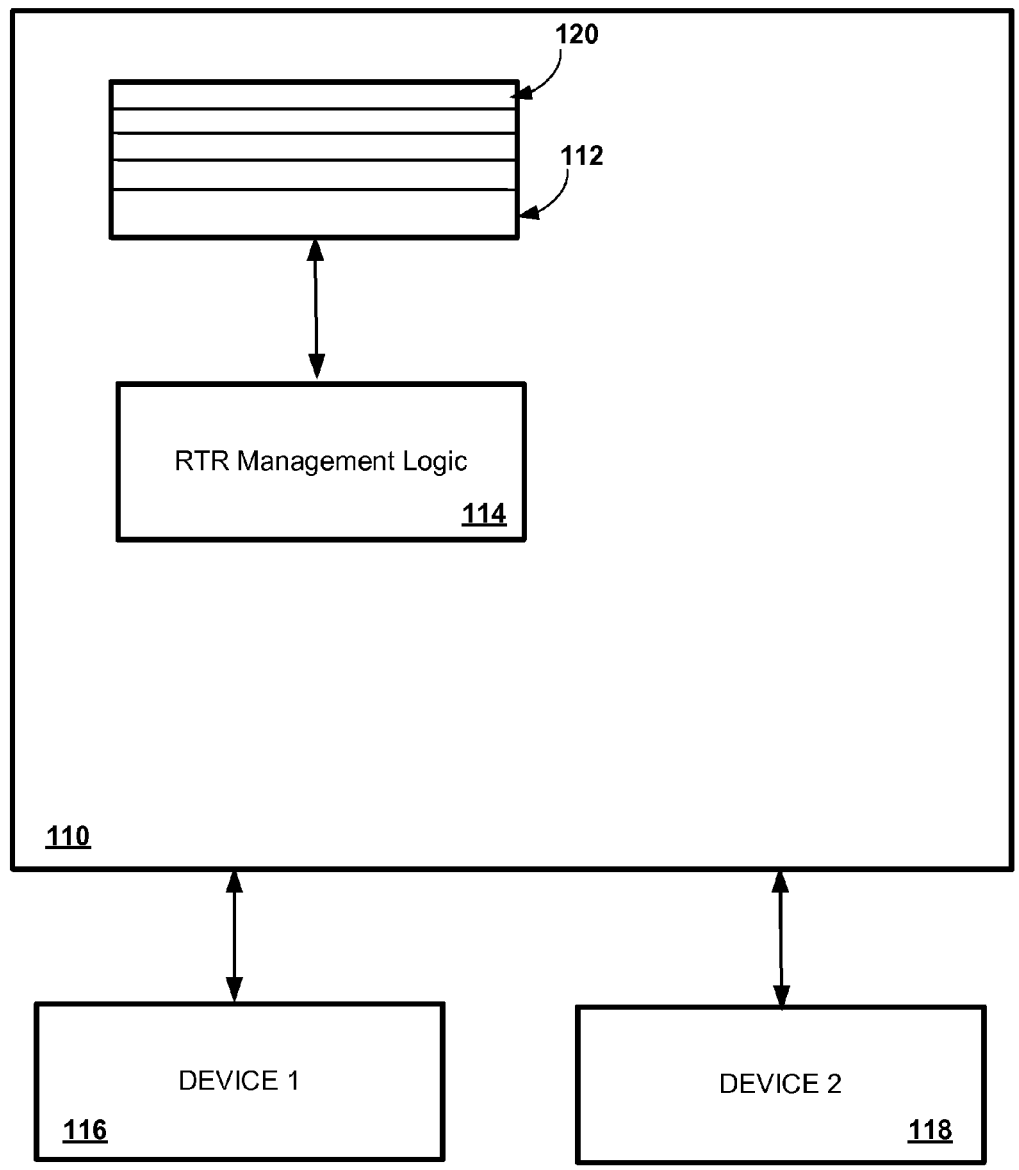
FIG. 7 is drawing showing embodiments of the present invention comprising a real-time-request database construct.

In some embodiments of the present invention described in relation to FIG. 7, a server system 110 may comprise, for recording and linking transactions, a real-time-request (RTR) database construct 112, for example a table, array or other database structure, and RTR management logic 114. The RTR management logic 114 may be embodied in software, hardware, firmware or a combination of such. Transactions between a first client device 116 and a second client device 118 may be handled through the server system 110 by the RTR management logic 114. An RTR database construct 112 may comprise a linked list of database entries, wherein each entry may represent a step in a storyline for a client device, 116, 118. An RTR database entry 120 may comprise generic data fields and other utility fields to accommodate single and multiple client storylines that may be step-synchronized between clients. The generic data fields may provide two-way communication between step-synchronized clients. In some embodiments, these fields may serve as semaphores for HTTP communication by communicating to client threads within an application instance. The communication may instruct a client thread to create, delay or otherwise process an HTTP response in relation to the actions of another client.

In some embodiments of the present invention, credentials may be included in every HTTP request. Exemplary credential may include username, password, client type and other credentials. In some embodiments, the credentials may be included as URL (Universal Resource Locator) parameters. In some embodiments of the present invention, a unique client-storyline identifier may be provided in each request which may be used the RTR management logic 114 to associate client requests with the appropriate multi-client storyline.

In some embodiments of the present invention, an RTR database entry 120 may not comprise a branch and may contain a single reference to a parent RTR database entry 120. Simultaneous features for a client device may be accommodated by simultaneous and separate storylines and RTR threads. An RTR database entry 120 may be a storyline step and may be used by any client device that may accommodate a single or multi-user storyline.

Figure 8:
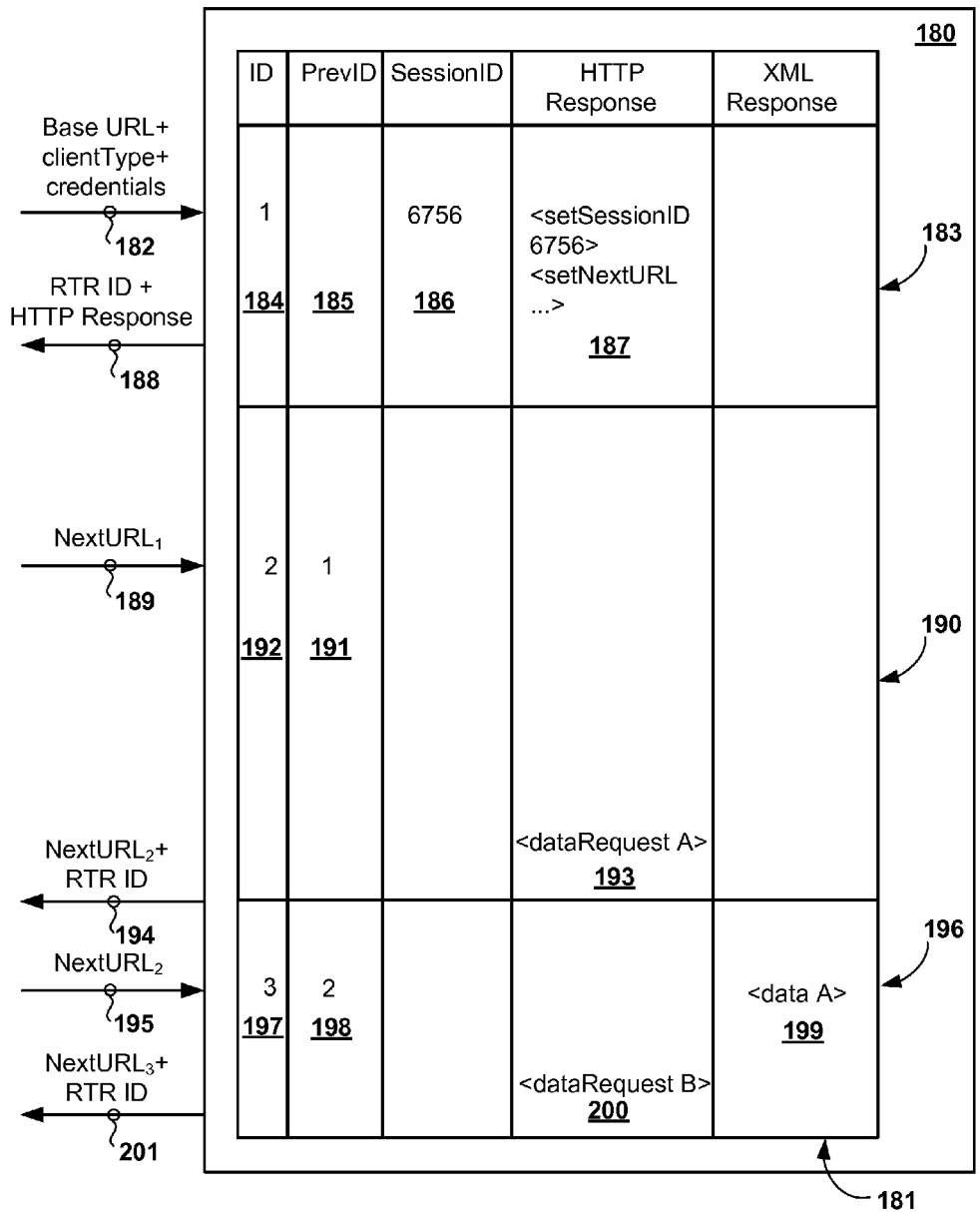
FIG. 8 is a drawing showing an exemplary transaction between a server system and an electronic device.

An exemplary transaction between a first client device and a server system may be described in relation to FIG. 8. In some embodiments of the present invention, a first client device may make a first request 182 to a server system 180 using a base location identifier associated with the server system 180. In some embodiments of the present invention, the base location identifier may comprise a URL, as shown in the exemplary transaction of FIG. 8. The client credentials and the client type for the first client device may be included in the parameters of the request 182. An entry 183 corresponding to the request 182 may be made in an RTR database construct 181 by RTR management logic. The entry 183 may comprise an RTR entry identifier (ID) 184, a previous RTR entry identifier (PrevID) 185, a session identifier (SessionID) 186 and other fields. In some embodiments of the present invention, the previous RTR entry identifier, PrevID, 185 may be null for the initial entry in the RTR database construct 181.

The RTR management logic may wait for an HTTP response field entry 187 corresponding to the first entry 183 to appear. In some embodiments, the wait may be effectuated by periodic polling, for example, polling every 0.5 seconds.

In some embodiments, for an initial call to the server system 180, the URL may not specify a class or a method, and the "DirectAction" class and the "DefaultAction" may be used by default. The "DirectAction" class may be loaded. "PerformActionNamed" may be executed, which may call "ValidDevice" in order to authenticate the request 182 with the first client device credentials received as parameters in the HTTP request 182. A "ValidDevice" object may be returned with a reference to the newly created RTR database construct 181. "DefaultAction" may then be called, which may create a "DeviceLoggedIn" object, which may return an XML response setting the session identifier, sessionID, and next URL (nextURL). The next URL, nextURL, may be computed by the "RealTimeRequest" class based on the previous RTR identifier, PrevID, 185 and the type of transaction. In some embodiments of the present invention, the RTR management logic may create a different URL for a transaction which may not wait for a client response and a transaction which may wait for a client response.

The server system 180, through the RTR management logic, may assign the session identifier, SessionID, 186 and may populate the HTTP Response field 187 in the RTR database construct 181 with an XML command to set the session identifier, sessionID, 186 and the next URL, $nextURL_1$. In some embodiments, the next URL, $nextURL_1$, may comprise a reference to the RTR entry identifier, ID, 184. The RTR management logic may detect the HTTP response 187 in the RTR database construct 181, and may copy the response 187 into the body of an HTTP response and may send 188 the response to the first client device.

The first client device may record the session identifier locally, for example in a graphical user interface or other location, and the first client device may then call 189 the next URL, $nextURL_1$. The next URL, $nextURL_1$, may contain a reference to the previously created RTR entry 183. The RTR management logic may create a new RTR entry 190 which may be linked to the previous RTR entry 183. In some embodiments, the linking may be effectuated by setting the previous RTR identifier, PrevID, field 191 to that value which identifies the previous RTR entry 184. A new RTR identifier 192 may be assigned.

A first data request to the client device may be made through the RTR database construct 181 by populating the HTTP Response portion 193 of the RTR database construct 181. The RTR management logic may detect the response 193 in the RTR database construct 181, and may send 194, in an XML command in the body of the HTTP response, the data request and a next URL, $nextURL_2$, to the first client device. The next URL, $nextURL_2$, may be encoded for the RTR thread. The first client device may call 195 the next URL, nextURL$_2$, with the requested data in the body of the request.

The next URL, nextURL$_2$, may contain a reference to the previously created RTR entry 190. The RTR management logic may create a new RTR entry 196 which may be linked to the previous RTR entry 190. In some embodiments, the linking may be effectuated by setting the previous RTR identifier, PrevID, field 198 in the new entry 196 to that value which identifies the previous RTR entry 192. A new RTR identifier 197 may be assigned. The RTR management logic may detect the data in the body of the request and may populate the XML response portion 199 of the RTR entry 196. A second data request may be made through the RTR database construct 181 by populating the HTTP Response portion 200 of the RTR database construct 181. The RTR management logic may detect the response 200 in the RTR database construct 181, and may send 201, in an XML command in the body of the HTTP response, the data request and a next URL, nextURL$_3$, to the first client device. The next URL, nextURL$_3$, may be encoded for the RTR thread.

In some embodiments of the present invention, the URLs, URL, URL$_1$, URL$_2$ and URL$_3$ may be distinct. In alternative embodiments of the present invention, the URLs may not be distinct.

Figure 9:
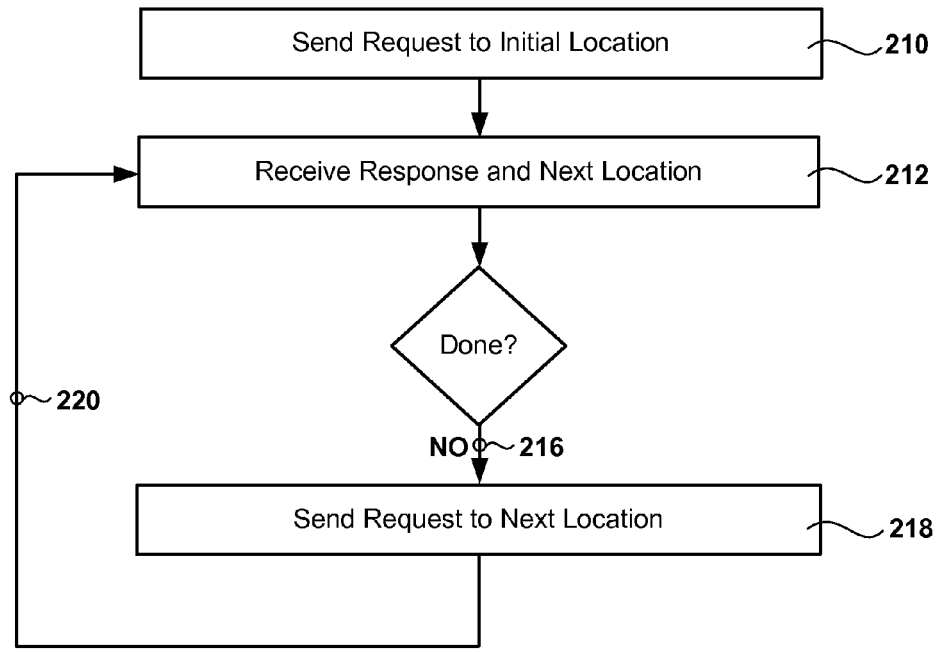
FIG. 9 is chart showing embodiments of the present invention comprising a an electronic device wherein the location for requests from the electronic device may be transmitted from the server system to the electronic device.

Some embodiments of the present invention may be described in relation to FIG. 9. A client device may send 210 a request to an initial location, for example the URL of a server or server system. The client device may receive 212 a response to the request and a next location to which the next request from the client may be sent. If the client device has not completed 216 the interaction with the server system, then the client device may send 218 the next request to the next location that was received 212 in the response from the from the server system. The request/response cycle may continue 220. In some embodiments of the present invention, the response from the server system received 212 at the client device may comprise a data request, instructions for the client device or other information in addition to the next location information. The request sent 218 from the client device to the server system may comprise data in addition to a request.

Figure 10:
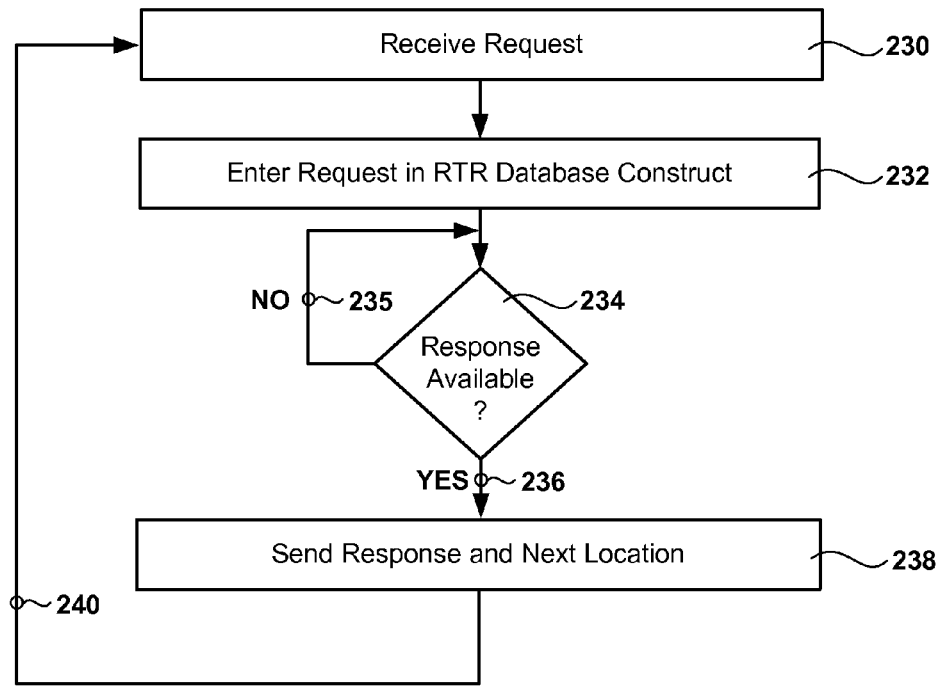
FIG. 10 is a chart showing embodiments of the present invention comprising a server system wherein the location for requests from an electronic device may be transmitted from the server system to the electronic device.

Some embodiments of the present invention may be described in relation to FIG. 10. A server system may receive 230 a request from a client device. The server system may enter 232 the request in an RTR database construct. The server system may determine 234 if a response to the request is available. If a response is not available 235, the server system may wait for a response to become available. When a response is available 236, the server system may send 238 the response and the location for a next request to the client device. The server system may then receive additional requests from the client device, continuing 240 the request/response cycle. When a request is entered 232 into the RTR database construct, the entry may be linked to previous entries in the thread or storyline. The response sent 238 to the client device may comprise instructions for the client device, a data request or other information.

Figure 11:
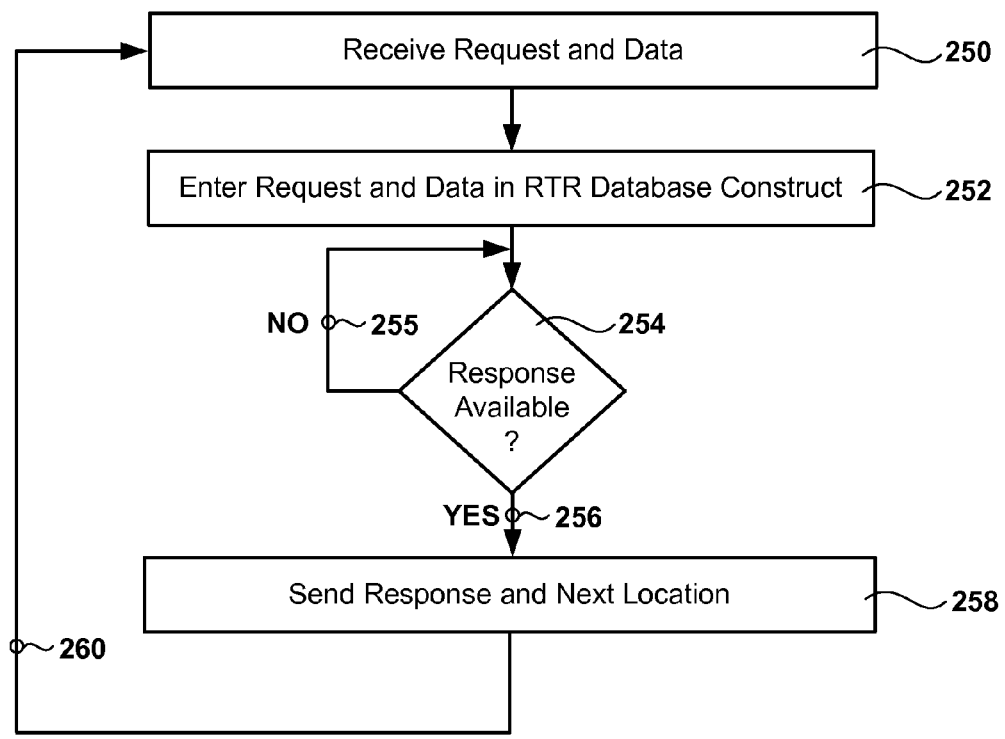
FIG. 11 is chart showing embodiments of the present invention comprising a server system wherein a data request may be sent in a response to an electronic device.

Some embodiments of the present invention may be described in relation to FIG. 11. A server system may receive 250 a request and data from a client device. The server system may enter 252 the request and the data in an RTR database construct. The server system may determine 254 if a response to the request is available. If a response is not available 255, the server system may wait for a response to become available. When a response is available 256, the server system may send 258 the response and the location for a next request to the client device. The server system may then receive additional requests and data from the client device, continuing 260 the request/response cycle. When a request and data are entered 252 into the RTR database construct, the entry may be linked to previous entries in the thread or storyline. The response sent 258 to the client device may comprise instructions for the client device, a data request or other information.

Figure 12:
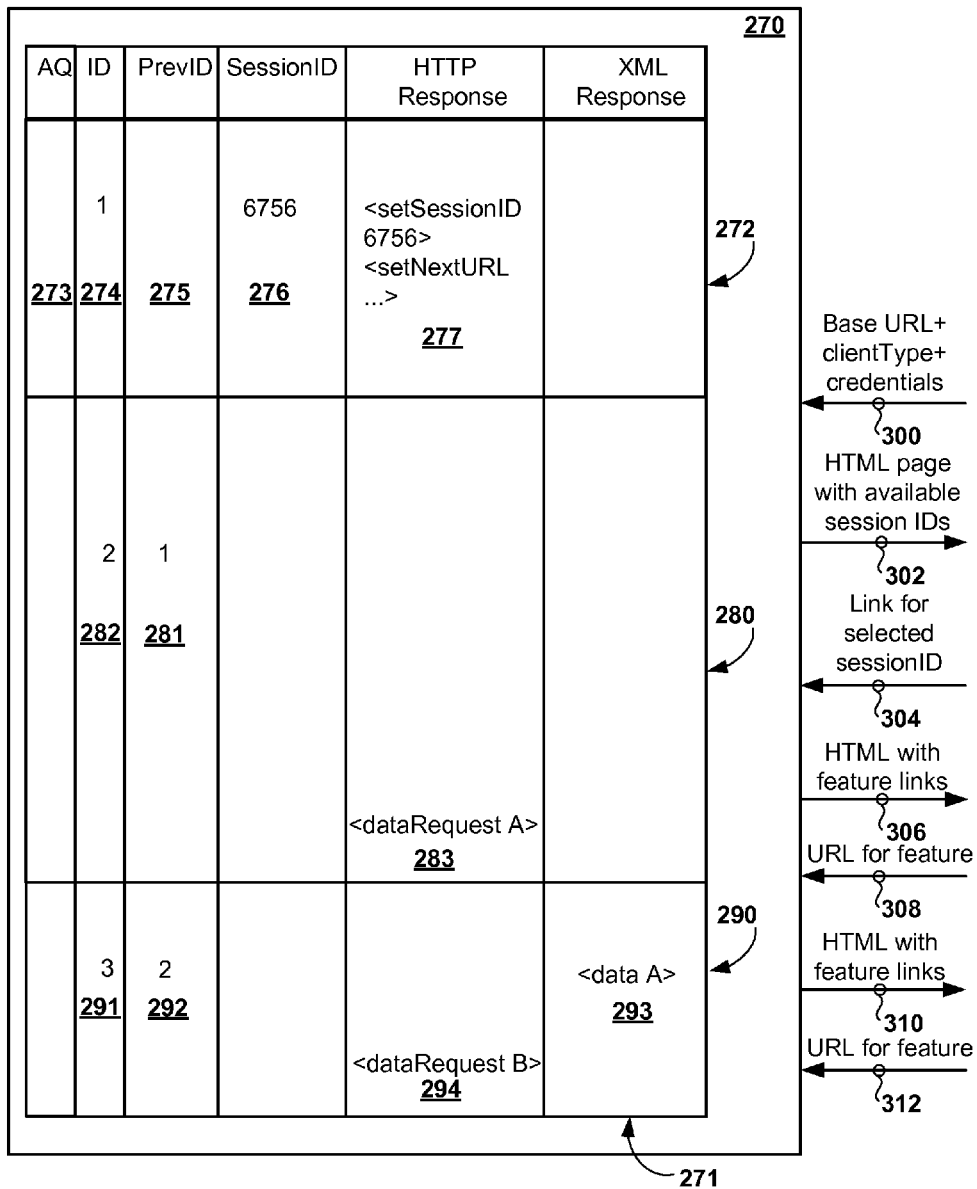
FIG. 12 is a drawing showing an exemplary transaction between a server system and an electronic device.

An exemplary transaction between a first client device and a server system may be described in relation to FIG. 12. In some embodiments of the present invention, a first client device may make a first request 300 to a server system 270 using a base location identifier associated with the server system 270. In some embodiments of the present invention, the base location identifier may comprise a URL. The client credentials and the client type for the first client device may be included in the parameters of the request 300. In some embodiments of the present invention, a runtime parameter may direct the server system 270 to present a login page to the first client device. In alternative embodiments, a runtime parameter may automatically log in any user to an associated user in the database. Based on the client type included as a parameter with the request 300, a default action may be called. In this exemplary transaction, the default action may effectuate the determination of a session identifier (SessionID) 276 for a session related to an available device for which there may be an RTR database construct 271 entry 272 which may indicate that the device is waiting for an HTTP response of which the first client device may provide. In some embodiments, several session identifiers each associated with a client device may be determined. The available session identifiers may be communicated 302 to the first client device from the server system 270. In some embodiments of the present invention, the available session identifiers may be communicated 302 in an HTML page.

A session identifier selected at the first client device may be submitted 304 to the server system. The RTR management logic associated with the RTR database construct 271 associated with the selected session identifier 276 may mark the RTR database construct as acquired (AQ) 273. A URL may be encoded as an "onchange" javascript command with the selected session identifier encoded in the URL. The URL may specify the "DirectAction" class and method to execute. In some embodiments the first client device credentials may be authenticated prior to calling the specified method. A top level graphical user interface for the identified storyline may be sent 306 to the first client device. A link for a feature may specify whether or not the feature requires communication from the device associated with the RTR database construct 271. If communication from the device associated with the RTR database construct 271 is not required, the feature may not effectuate a new RTR database construct 271 entry, and the device associated with the RTR database construct 271 may be unaware of the transaction. The first client device may submit 308 a URL that may specify a "DirectAction" class and method for a feature. The server system may load the class and call the specified action. In some embodiments of the present invention, the first client device credentials may be validated in each such call. If the feature requires information from the device associated with the RTR database construct 271, then the HTTP Response portion 283 of the RTR database construct entry 280 may be populated with the request. The information required may be specified by a special key in the URL.

The RTR management logic may determine the populated field and send the response and the next URL to the device associated with the RTR database construct 271. The requested data 293 may be entered in RTR database construct 271 upon receipt by the client device associated with the RTR database construct 271 and sent 310 to the first client device.

The first client device may use the data and request additional data by submitting 312 another URL for a feature and request for information.

Figure 13:
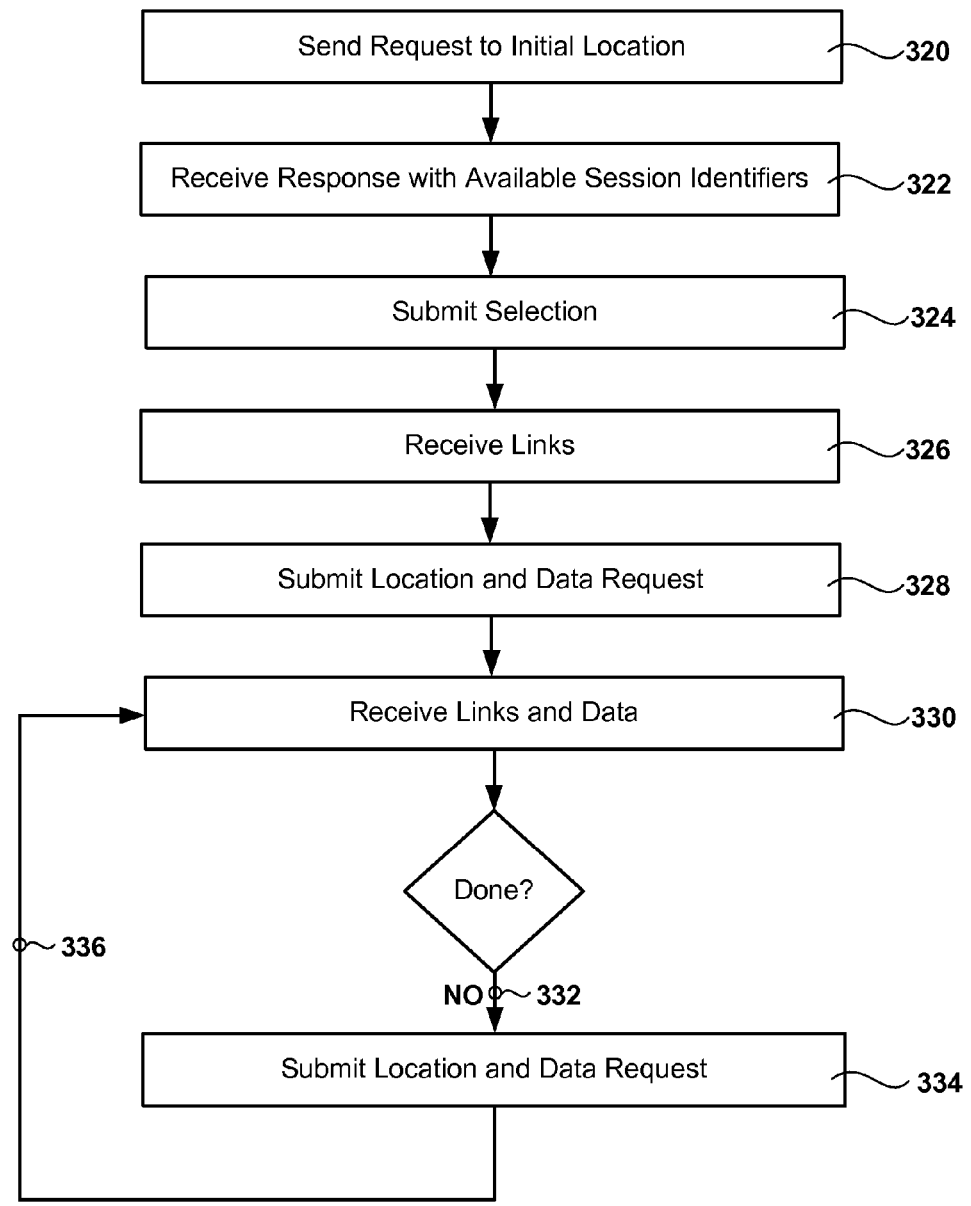
FIG. 13 is a chart showing embodiments of the present invention comprising a transaction between a server system and an electronic device.

Some embodiments of the present invention may be described in relation to FIG. 13. A client device may send 320 a request to an initial location. In some embodiments of the present invention, the initial location may be related to a server system, and the initial location may comprise a base URL associated with the server system. In some embodiments of the present invention, the client credentials and the client type for the first client device may be included in the parameters of the request The client device may receive 322 a response for the server system. The received response may comprise a list of available session identifiers for which the client device may interact. The client device may submit 324 a selected session identifier to the server system. The client device may then receive 326 information containing links to features associated with the selected session identifier. The client device may submit 328 a link related to a desired feature and a data request to the server system. The client device may receive 330 subsequent links and any data received at the server in response to the data request. If additional data is required 332, the client device may submit 334 additional links and data requests, continuing 336 a submit and receive process.

Figure 14:
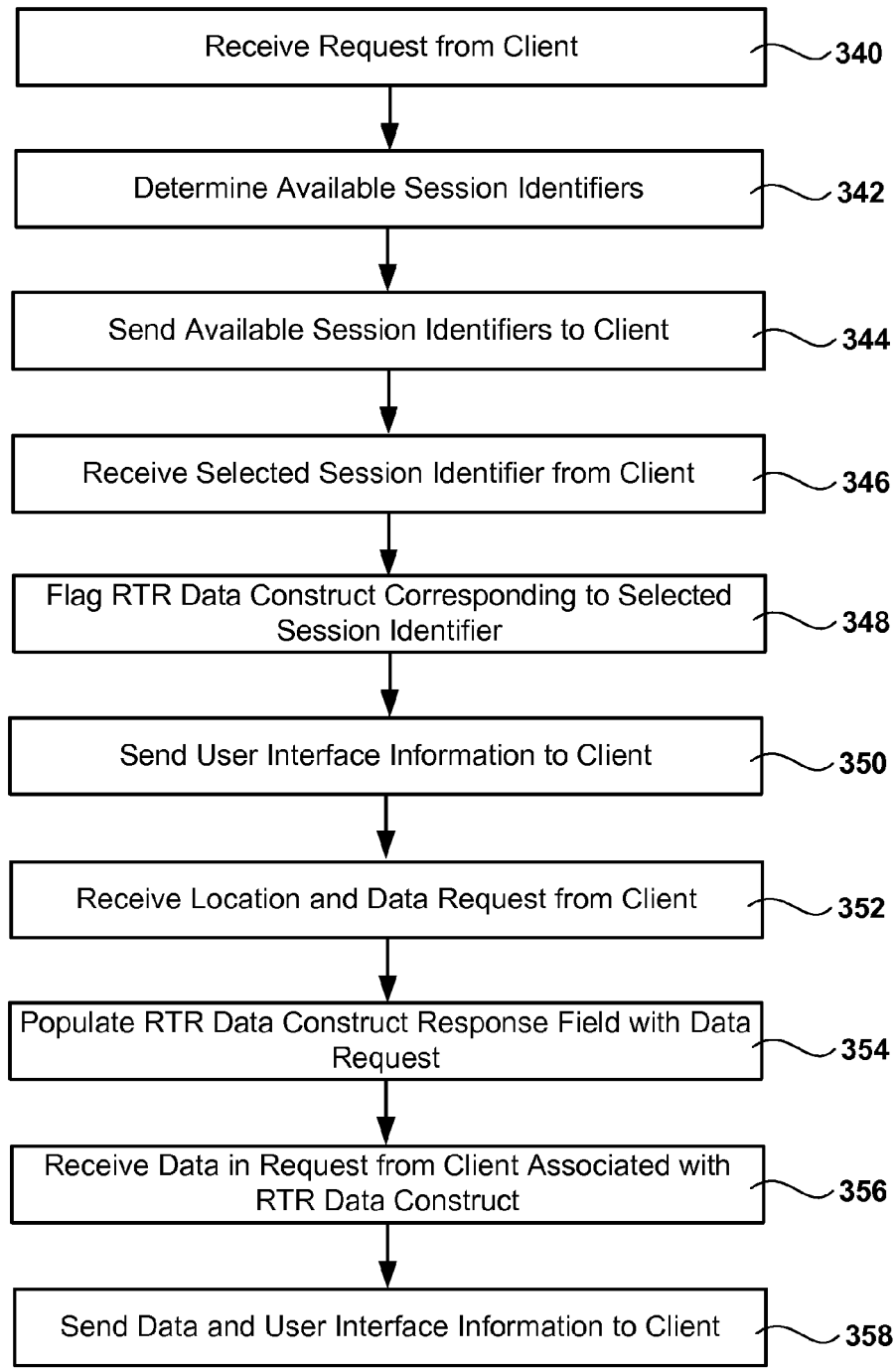
FIG. 14 is a chart showing embodiments of the present invention comprising a transaction between a server system and an electronic device.

Some embodiments of the present invention may be described in relation to FIG. 14. A server system may receive 340 a request from a client device. The server system may then determine 342 the session identifiers for available threads related to the client device request. In some embodiments, the server system may determine 342 the availability by accessing the RTR data constructs associated with connected client devices. The server system may send 344 a list of the available session identifiers to the client device from which the server system received 340 the request. The server system may then receive 346 a selected session identifier from the client device. The server system may then flag 348 the RTR data construct corresponding to the selected session identifier which may prevent other devices from attaching to the thread. The server system may then send 350 user interface information to the client device from which the request was received. The server system may then receive 352 a location for a feature selected by the client device and a data request from the client device. In some embodiments, the location may be a URL for the feature. The server system may populate 354 the response field of the RTR data construct associated with the session identifier selected by the client device with the data request. The server system may receive 356 the requested data from the client associated with the RTR data construct and may send 358 the data and additional user interface data to the client device.

In some embodiments of the present invention, the server system may create HTTP responses by utilizing "WODirectAction." "WODirectActions" may respond to stateless HTTP requests and may build HTTP responses directly by creating a "WOResponse" or by creating and returning a "WOComponent." Since the application may be stateless, the abstract class "ValidatedDirectAction," which may inherit from "WODirectAction," may be used as a base class for the various "DirectAction" classes. In some embodiments, the base URL may not contain references to the "DirectAction" or method and "WebObjects" may automatically assume "DirectAction" class and "defaultAction" method.

In some embodiments of the present invention, when an HTTP request is made, the URL may contain the "DirectAction" class name and method therein that will generate the HTTP response, except for the initial URL, which may omit these fields. When the field are omitted, by default the class "DirectAction" and method "defaultAction" may be called.

In some embodiments of the present invention, when the "DirectAction" class is loaded, the method "performActionNamed" may be called. Some embodiments may execute the method specified in the URL (or "defaultAction" if omitted). In some embodiments, "performActionNamed" may be overridden in "ValidatedDirectAction." In these embodiments, client validation may be performed first, and a concrete instance of "ValidClient" may be obtained before returning the "WOResponse" provided by the specified method. Since the class containing the method "performActionNamed" also may be the class with the method that will be called, "performActionNamed" may assign the "ValidClient" instance to a class variable that may be accessed by the method. The "ValidClient" instance also may refer to a current RTR database construct, which was obtained during authentication.

Some of the above-described embodiments of the present invention have been described in relation to an Apple WebObjects application server. This exemplary application server is used by way of example and not limitation. Other application servers known in the art may be used in these embodiments.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for synchronizing communication between a first device and a second device, said method comprising:

receiving, at a server system comprising real-time-request (RTR) management logic, a first request from a first device, wherein said first device and said server system are communicatively coupled and said first request uses a base location identifier associated with said server system;

establishing, on said server system, using said RTR management logic, a real-time request (RTR) database construct linking said first device and a second device, wherein said RTR database construct comprises a linked list of database entries wherein each entry represents a step in a storyline for said first device;

using said RTR management logic, entering said first request in said RTR database construct, thereby producing a first entry in said RTR database construct;

through said RTR management logic, assigning a first session identifier associated with said first entry;

entering said first session identifier in a session-identification field associated with said first entry in said RTR database construct;

through said RTR management logic, assigning a first entry identifier associated with said first entry;

entering said first entry identifier in an entry-identification field associated with said first entry in said RTR database construct;

through said RTR management logic, populating a response field associated with said first entry in said RTR database construct with a command to set a session identifier to said first session identifier and a first next-location identifier, wherein said first next-location identifier comprises a reference to said first entry identifier;

detecting said populated response field associated with said first entry in said RTR database construct;

copying said command to set a session identifier to said first session identifier and said first next-location identifier from said response field associated with said first entry in said RTR database construct to a first response;

sending said first response to said first device;

receiving, from said first device at said server system, a call to said first next-location identifier;

using said RTR management logic, creating a second entry in said RTR database construct, wherein said second entry in said RTR database construct is linked to said first entry in said RTR database construct through said reference in said first next-location identifier to said first entry identifier;

through said RTR management logic, assigning a second entry identifier associated with said second entry in said RTR database construct;

entering said second entry identifier in an entry-identification field associated with said second entry in said RTR database construct;

receiving, at said server system, a first data request for said first device from said second device, wherein said second device and said server system are communicatively coupled;

through said RTR management logic, populating a response field associated with said second entry in said RTR database construct with a command associated with said first data request and a second next-location identifier, wherein said second next-location identifier comprises a reference to said second entry identifier;

detecting said populated response field associated with said second entry in said RTR database construct;

copying said a command associated with said first data request and said second next-location identifier from said response field associated with said second entry in said RTR database construct to a second response;

sending said second response to said first device.

2. A method according to claim 1, wherein said base location identifier is a URL.

3. A method according to claim 1, wherein said first request comprises first-device credentials for said first device.

4. A method according to claim 1, wherein said second response comprises second-device credentials for said second device.

5. A method according to claim 1, wherein said call to said first next-location identifier comprises first-device credentials for said first device.

6. A method according to claim 1 further comprising receiving, from said first device at said server system, a call to said second next-location identifier.

7. A method according to claim 6, wherein said call to said second next-location identifier comprises data requested in said first data request.

8. A method according to claim 7, wherein:

said data requested in said first data request is detected in said call to said second next-location identifier by said RTR management logic; and said data requested in said first data request is entered in a third entry in said RTR database construct by said RTR management logic.

9. A method according to claim 8, wherein said data requested in said first data request is entered in an XML response field associated with said third entry in said RTR database construct by said RTR management logic.

10. A method according to claim 6 further comprising:

using said RTR management logic, creating a third entry in said RTR database construct, wherein said third entry in said RTR database construct is linked to said second entry in said RTR database construct through said reference in said second next-location identifier to said second entry identifier;

through said RTR management logic, assigning a third entry identifier associated with said third entry in said RTR database construct; and entering said third entry identifier in an entry-identification field associated with said third entry in said RTR database construct.

11. A method according to claim 1, wherein said first device is a television.

12. A method according to claim 1, wherein said second device is associated with a customer service representative.

13. A method according to claim 1 further comprising maintaining said RTR database construct when said first device and said server system are no longer communicatively coupled.

14. A method according to claim 1 further comprising sending from said server system to said second device graphical user interface information.

15. A method according to claim 14, wherein said graphical user interface information comprises an HTML page.

16. A system for synchronizing communication between a first device and a second device, said system comprising:

in a server system, a request receiver for receiving a first request from a first device, wherein said server system is remotely located in relation to said first device and said first request uses a base location identifier associated with said server system;

wherein the server system comprises a memory and a processor;

a session-identifier recorder for entering a first session identifier in a session-identification field associated with a first entry in a real-time-request (RTR) database construct;

a first entry-identifier recorder for entering a first entry identifier in an entry-identification field associated with said first entry in said RTR database construct;

a first response-field detector for detecting a populated response field associated with said first entry in said RTR database construct;

a first command copier for copying a command to set a session identifier to said first session identifier and a first next-location identifier from said response field associated with said first entry in said RTR database construct to a first response;

a first response transmitter for sending said first response to said first device;

a call receiver for receiving, from said first device at said server system, a call to said first next-location identifier;

a second entry-identifier recorder for entering a second entry identifier in an entry-identification field associated with a second entry in said RTR database construct;

a data-request receiver for receiving, at said server system, a first data request for said first device from said second device, wherein said second device and said server system are communicatively coupled;

a second response-field detector for detecting a populated response field associated with said second entry in said RTR database construct;

a second command copier for copying a command associated with said first data request and a second next-location identifier from said response field associated with said second entry in said RTR database construct to a second response;

a second response transmitter for sending said second response to said first device; and real-time-request (RTR) management logic for:
> establishing, on said server system, said real-time-request (RTR) database construct linking said first device and said second device, wherein said RTR database construct comprises a linked list of database entries wherein each entry represents a step in a storyline for said first device;
> entering said first request in said RTR database construct, thereby producing said first entry in said RTR database construct;
> assigning said first session identifier associated with said first entry;
> assigning said first entry identifier associated with said first entry;
> populating said response field associated with said first entry in said RTR database construct with said command to set a session identifier to said first session identifier and said first next-location identifier, wherein said first next-location identifier comprises a reference to said first entry identifier;
> creating said second entry in said RTR database construct, wherein said second entry in said RTR database construct is linked to said first entry in said RTR database construct through said reference in said first next-location identifier to said first entry identifier;
> assigning said second entry identifier associated with said second entry; and
> populating said response field associated with said second entry in said RTR database construct with said command associated with said first data request and said second next-location identifier, wherein said second next-location identifier comprises a reference to said second entry identifier.

17. A system according to claim 16, wherein said first response comprises a data request.

18. A system according to claim 17, wherein said second request comprises data in response to said data request.

19. A system according to claim 16, wherein said first device is a television.

20. A system according to claim 16, wherein said second device is associated with a customer server representative.

* * * * *